United States Patent
Nacer et al.

(10) Patent No.: US 10,440,645 B2
(45) Date of Patent: Oct. 8, 2019

(54) EXTENDING SIGNAL COVERAGE AND CHARGE DURATION OF A USER EQUIPMENT

(71) Applicant: Verizon Patent and Licensing Inc., Arlington, VA (US)

(72) Inventors: Jeremy Nacer, Morris Plains, NJ (US); Christopher M. Schmidt, Branchburg, NJ (US); Balaji L. Raghavachari, Bridgewater, NJ (US); Musa Kazim Guven, Basking Ridge, NJ (US); Iftekhar Rahman, Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/290,780

(22) Filed: Oct. 11, 2016

(65) Prior Publication Data

US 2018/0103426 A1  Apr. 12, 2018

(51) Int. Cl.
*H04W 52/02* (2009.01)
*H04L 12/26* (2006.01)
*H04W 24/10* (2009.01)

(52) U.S. Cl.
CPC ......... *H04W 52/0209* (2013.01); *H04L 43/08* (2013.01); *H04L 43/16* (2013.01);
(Continued)

(58) Field of Classification Search
CPC .. H04B 7/0413; H04B 7/0417; H04B 7/0626; H04B 7/0689; H04B 7/0691;
(Continued)

(56) References Cited

U.S. PATENT DOCUMENTS

| 2004/0170191 A1* | 9/2004 | Guo | H04W 36/0088 370/468 |
| 2011/0237289 A1* | 9/2011 | Fodor | H04W 52/367 455/522 |

(Continued)

OTHER PUBLICATIONS

3GPP, "Release 13," http://www.3gpp.org/release-13, May 25, 2016, 2 pages.
(Continued)

*Primary Examiner* — Alejandro Rivero
*Assistant Examiner* — Paul P Tran

(57) ABSTRACT

A device may receive signal information associated with a wireless signal or charge information associated with a charge level. The signal information may indicate a signal strength of the wireless signal. The charge information may indicate the charge level of a battery of the device. The device may determine whether the signal strength or the charge level satisfies a threshold. The device may configure a parameter or a setting of the device to cause the device to operate according to a long term evolution (LTE) category based on determining whether the signal strength or the charge level satisfies the threshold. The LTE category may be different from a default LTE category of the device and may define an uplink/downlink capability specification. The device may attach to a network in association with configuring the parameter or the setting to cause the device to operate according to the LTE category.

20 Claims, 9 Drawing Sheets

(52) U.S. Cl.
CPC ............. *H04W 24/10* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/142* (2018.01); *Y02D 70/144* (2018.01); *Y02D 70/164* (2018.01); *Y02D 70/20* (2018.01); *Y02D 70/21* (2018.01); *Y02D 70/22* (2018.01); *Y02D 70/24* (2018.01); *Y02D 70/26* (2018.01)

(58) Field of Classification Search
CPC ..... H04L 1/0045; H04L 5/0007; H04L 5/001; H04L 5/0023; H04L 5/0091; H04L 5/0092; H04L 5/0094; H04L 43/08; H04L 43/16; H04L 5/0053; H04W 8/082; H04W 8/22; H04W 8/245; H04W 24/04; H04W 24/10; H04W 28/04; H04W 36/0005; H04W 36/0022; H04W 36/14; H04W 36/24; H04W 36/245; H04W 36/36; H04W 48/17; H04W 48/20; H04W 52/0209; H04W 68/02; H04W 72/048; H04W 72/04; H04W 72/0406; H04W 72/1284; H04W 88/10; H04W 88/02; H04W 52/02; H04W 52/0225; H04W 52/0229; H04W 52/028; H04W 52/0261; H04W 52/0277; Y02D 70/00; Y02D 70/10; Y02D 70/12; Y02D 70/126; Y02D 70/1264; Y02D 70/142; Y02D 70/144; Y02D 70/164; Y02D 70/20; Y02D 70/21; Y02D 70/22; Y02D 70/24; Y02D 70/26
USPC ............... 370/252, 254, 280, 311, 329, 331; 375/219; 455/418, 422.1, 423, 426.1, 455/436, 450, 574
See application file for complete search history.

(56) References Cited

U.S. PATENT DOCUMENTS

| | | | | |
|---|---|---|---|---|
| 2011/0274071 | A1* | 11/2011 | Lee | H04B 7/0417 370/329 |
| 2012/0207115 | A1* | 8/2012 | Oh | H04L 5/0092 370/329 |
| 2013/0310022 | A1* | 11/2013 | Daniel | H04W 24/00 455/423 |
| 2014/0235242 | A1* | 8/2014 | Granzow | H04W 48/17 455/436 |
| 2015/0146685 | A1* | 5/2015 | Han | H04W 36/30 370/331 |
| 2016/0105873 | A1* | 4/2016 | Gaal | H04L 5/0005 370/330 |
| 2016/0150443 | A1* | 5/2016 | Suryavanshi | H04L 67/1042 370/331 |
| 2016/0227427 | A1* | 8/2016 | Vajapeyam | H04W 76/048 |
| 2016/0302024 | A1* | 10/2016 | Bennett | H04W 4/70 |
| 2016/0316358 | A1* | 10/2016 | Orr | H04W 8/22 |
| 2017/0064650 | A1* | 3/2017 | Sugumar | H04W 52/38 |
| 2017/0347283 | A1* | 11/2017 | Kodaypak | H04W 4/70 |
| 2018/0198502 | A1* | 7/2018 | Kim | H04B 7/046 |

OTHER PUBLICATIONS

Graham Prophet, "Network test system set up for 4G, many-device, IoT support: p. 2 of 2," http://www.electronics-eetimes.com/news/network-test-system-set-4g-many-device-iot-support/page/0/1, Mar. 3, 2016, 2 pages.

LinkLabs, "LTE eDRX and PSM Explained for LTE-M1," http://www.link-labs.com/lte-e-drx-psm-explained-for-lte-m1/, May 22, 2016, 4 pages.

3GPP, "Technical Specification: LTE; Evolved Universal Terrestrial Radio Access (E-UTRA); User Equipment (UE) radio access capabilities (3GPP TS 36.306 version 13.1.0 Release 13)," http://www.etsi.org/deliver/etsi_ts/136300_136399/136306/13.01.00_60/ts_136306v130100p.pdf, Apr. 2016, 55 pages.

* cited by examiner

EXTENDING SIGNAL COVERAGE AND CHARGE DURATION OF A USER EQUIPMENT

BACKGROUND

A wireless device may operate by communicating via radio waves using a system of base stations. The base stations may send and receive calls, and relay the calls to other base stations. The coverage of a base station may include the geographic area where the base station can communicate with the wireless device. In addition, a wireless device may operate using batteries as a power and/or energy source. The state of charge of the wireless device battery may include the amount of power and/or energy left in the battery compared with the amount power and/or energy the battery had when the battery was full.

DETAILED DESCRIPTION OF PREFERRED EMBODIMENTS

The following detailed description of example implementations refers to the accompanying drawings. The same reference numbers in different drawings may identify the same or similar elements.

User equipment (UE), such as smartphones, mobile phones, or tablet computers, may need a sufficient signal strength to communicate and/or a sufficient charge level to operate. However, a UE may be located in an area without sufficient signal strength to communicate, such as in a rural area, within a structure (e.g., a building, a tunnel, etc.), or the like. In addition, particular functions of the UE (e.g., streaming video, receiving and transmitting background data, web browsing, etc.) may discharge the battery of the UE at a rate faster than desirable, such as when the battery has a low charge level.

Implementations described herein may enable a UE to configure to operate according to a particular UE category or device category (e.g., a third generation partnership project (3GPP) UE category) based on a signal strength of a wireless signal received by the UE and/or a charge level of a battery of the UE satisfying a threshold. In this way, communications of the UE may be improved by permitting the UE to communicate when the signal strength would otherwise prevent, or disrupt, the UE from communicating. Additionally, or alternatively, battery and/or power resources of the UE may be conserved by modifying one or more particular functionalities of the UE that consume significant battery and/or power resources.

Figure 1A:
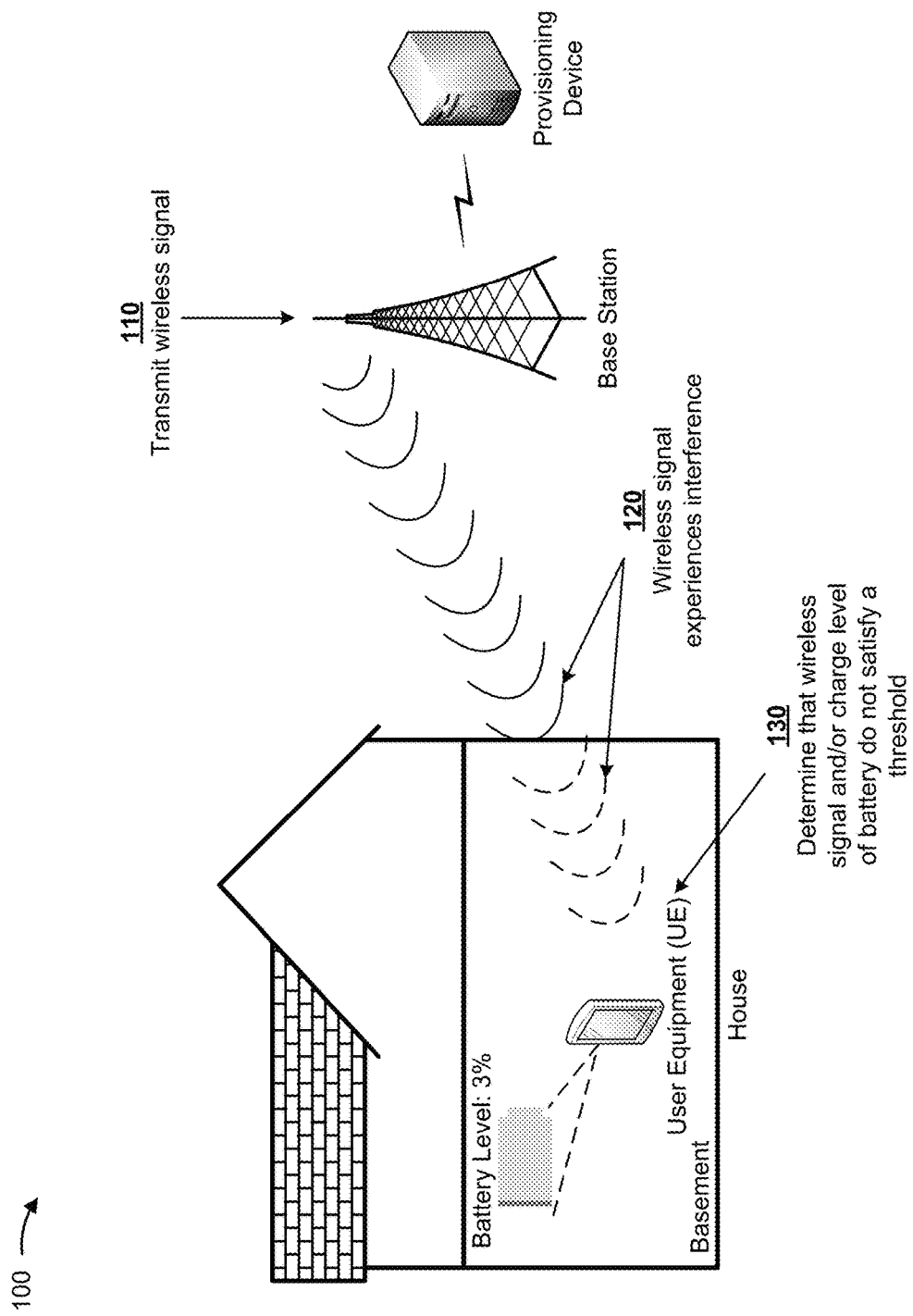
FIGS. 1A and 1B are diagrams of an overview of an example implementation described herein.
Figure 1B:
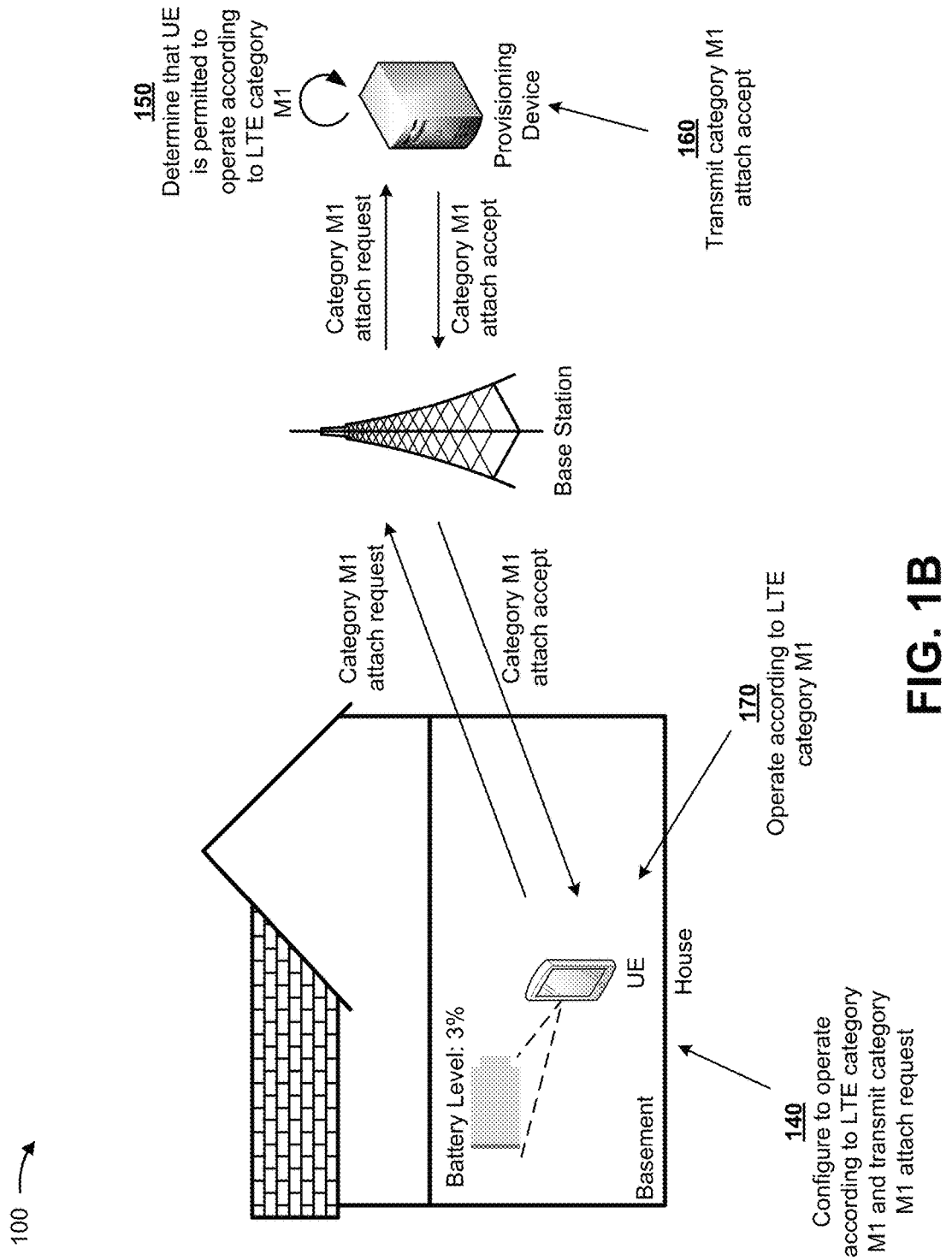

FIGS. 1A and 1B are diagrams of an overview of an example implementation 100 described herein. Example implementation 100 includes a provisioning device, a base station, and a house. For this example, assume the house includes a basement having a UE located therein. Assume further that the UE has a battery charge level of three percent (3%).

As shown by FIG. 1A, and by reference number 110, the base station may transmit a wireless signal. For example, the base station may transmit a radio frequency (RF) signal. As shown by reference number 120, the wireless signal from the base station may experience interference, due to, for example, a portion of the structure of the house and/or basement (e.g., a wall, a roof, or a foundation). In some cases, the wireless signal may experience interference other than physical interference, such as radio interference. In addition, the wireless signal received by the user equipment may be weakened due the user equipment being located geographically distance from the base station.

As shown by reference number 130, the UE may determine that the signal strength of the wireless signal received by the UE and/or the battery charge level of the UE do not satisfy a threshold. For example, the UE may determine that the signal strength of the wireless signal does not satisfy a threshold quantity of decibels to milliwatts (dBm). As another example, the UE may determine that the charge level of the battery does not satisfy a threshold amount of voltage.

As shown by FIG. 1B, and by reference number 140, the UE may configure to operate according to long term evolution (LTE) category M1 and may transmit an LTE category M1 attach request message to the base station. For example, the UE may configure settings or parameters related to functionality of the UE to operate according to LTE category M1 based on the signal strength and/or the battery charge level not satisfying a threshold. In some implementations, configuring to operate according to LTE category M1 may improve communication and/or extend a charge of a battery of the UE, as described elsewhere herein. As further shown in FIG. 1B, the UE may transmit the LTE category M1 attach request message to the provisioning device via a base station.

As shown by reference number 150, the provisioning device may determine that the UE is permitted to operate according to LTE category M1. For example, the provisioning device may use a data structure to identify information indicating that the UE is permitted to operate according to LTE category M1.

As shown by reference number 160, the provisioning device may transmit an LTE category M1 attach accept message to the base station, and the base station may transmit the LTE category M1 attach accept message to the UE. Based on receiving the LTE category M1 attach accept message, and as shown by reference number 170, the UE may operate according to LTE category M1.

In this way, communications of the UE may be improved by permitting the UE to communicate when the signal strength would otherwise prevent the UE from communicating. Additionally, or alternatively, battery and/or power resources of the UE may be conserved by modifying one or more particular functionalities of the UE that consume significant battery and/or power resources.

As indicated above, FIGS. 1A and 1B are provided merely as an example. Other examples are possible and may differ from what was described with regard to FIGS. 1A and 1B. For example, rather than configuring specifically to LTE category M1, the UE may configure to any LTE category that is a lower category than the LTE category at which the UE is currently operating. In addition, the UE may configure to another type of device category, such as a non-LTE category (e.g., a wireless device category other than an LTE category). For example, the UE may configure to device category narrow band 1 (NB1) (also referred to as category narrow band-Internet of things (NB-IoT)), rather than configuring to LTE category M1. In other words, while implementations are described herein with respect to LTE categories, and specifically LTE category M1, implementations may include any type of LTE or non-LTE device category.

Figure 2:
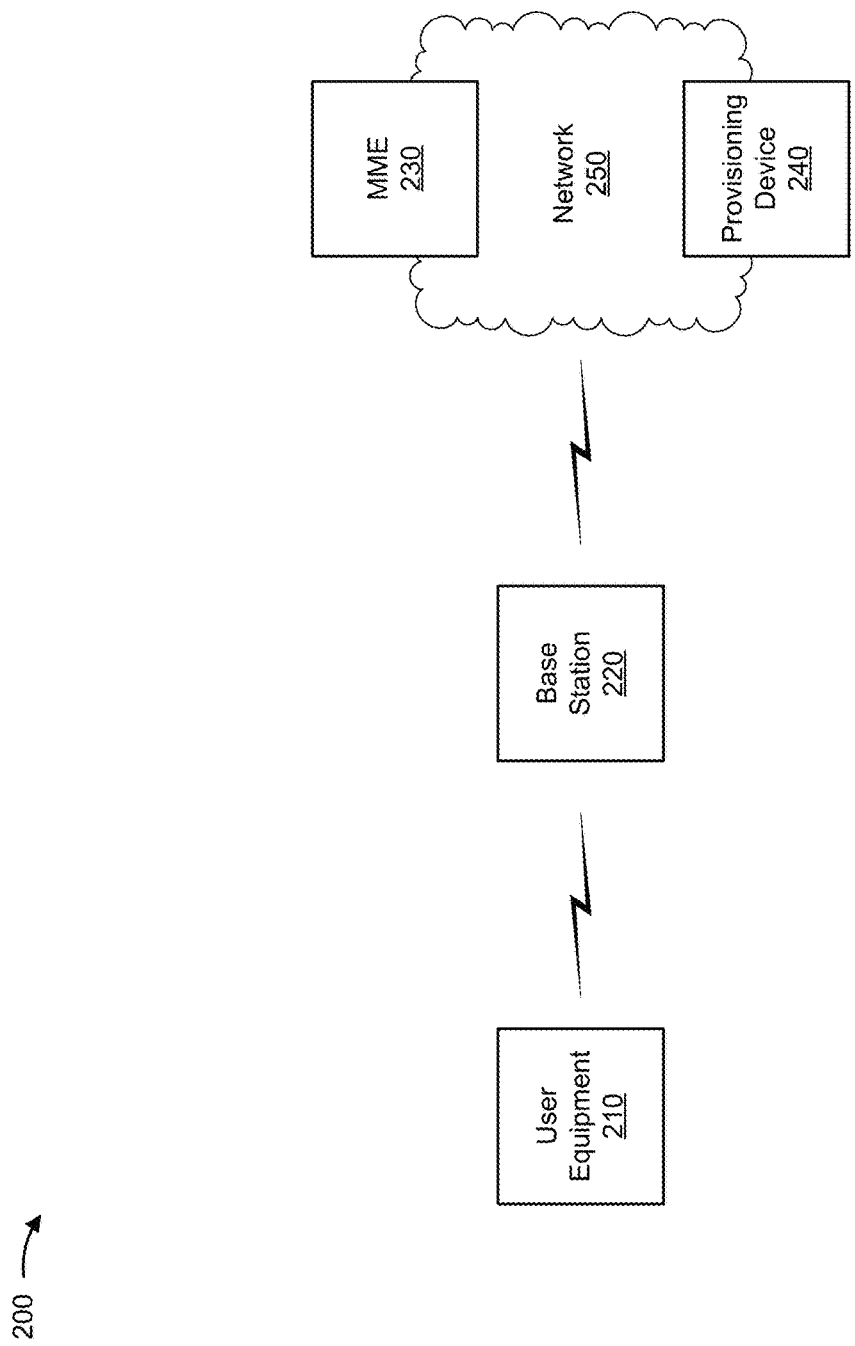
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user equipment (UE) 210, a base station 220, a mobility management entity device (MME) 230, a provisioning device 240, and a network 250. Devices of environment 200 may interconnect via wired connections, wireless connections, or a combination of wired and wireless connections.

UE 210 includes one or more devices capable of communicating with base station 220 and/or a network (e.g., network 250). For example, UE 210 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, UE 210 may detect a signal strength of a wireless signal and/or a charge level of a battery, as described elsewhere herein. Additionally, or alternatively, UE 210 may configure to operate according to a particular UE category based on the signal strength and/or the charge level, as described elsewhere herein.

Base station 220 includes one or more devices capable of transferring traffic, such as audio, video, text, and/or other traffic, destined for and/or received from UE 210. In some implementations, base station 220 may include an evolved Node B (eNB) associated with a long term evolution (LTE) network that receives traffic from and/or sends traffic to an external network via a serving gateway (SGW) and/or a packet data network gateway (PGW). Base station 220 may send traffic to and/or receive traffic from UE 210 via an air interface. In some implementations, base station 220 may include a small cell base station, such as a base station of a microcell, a picocell, and/or a femtocell.

MME 230 includes one or more devices, such as one or more server devices, capable of managing authentication, activation, deactivation, and/or mobility functions associated with UE 210. In some implementations, MME 230 may perform operations relating to authentication of UE 210. Additionally, or alternatively, MME 230 may facilitate the selection of a particular serving gateway (SGW) and/or a particular packet data network gateway (PGW) to serve traffic to and/or from UE 210. MME 230 may perform operations associated with handing off UE 210 from a first base station 220 to a second base station 220 when UE 210 is transitioning from a first cell associated with the first base station 220 to a second cell associated with the second base station 220. Additionally, or alternatively, MME 230 may select another MME (not pictured), to which UE 210 should be handed off (e.g., when UE 210 moves out of range of MME 230).

Provisioning device 240 includes one or more devices, such as one or more server devices, capable of managing (e.g., receiving, generating, storing, processing, and/or providing) information associated with UE 210. For example, provisioning device 240 may manage subscription information associated with UE 210, such as information that identifies one or more UE categories according to which UE 210 is permitted to operate, information that identifies a subscriber profile of a user associated with UE 210, information that identifies services and/or applications that are accessible to UE 210, location information associated with UE 210, a network identifier (e.g., a network address) that identifies UE 210, information that identifies a treatment of UE 210 (e.g., quality of service information, a quantity of minutes allowed per time period, a quantity of data consumption allowed per time period, etc.), and/or similar information. Provisioning device 240 may provide this information to one or more other devices of environment 200 to support the operations performed by those devices.

In some implementations, provisioning device 240 may include a home subscriber server (HSS), a policy and charging rules function (PCRF), or a similar type of device. Additionally, or alternatively, provisioning device 240 may include an open mobile alliance device management (OMADM) device, or a similar type of device, capable of providing information, such as service information, related to whether UE 210 has permission to configure to operate according a particular UE category. For example, UE 210 may provide the information to enable UE 210 to determine whether UE 210 has permission to operate according to the particular UE category, thereby reducing or eliminating the need for provisioning device 240 to determine whether UE 210 has permission.

Network 250 includes one or more wired and/or wireless networks. For example, network 250 may include a cellular network (e.g., an LTE network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
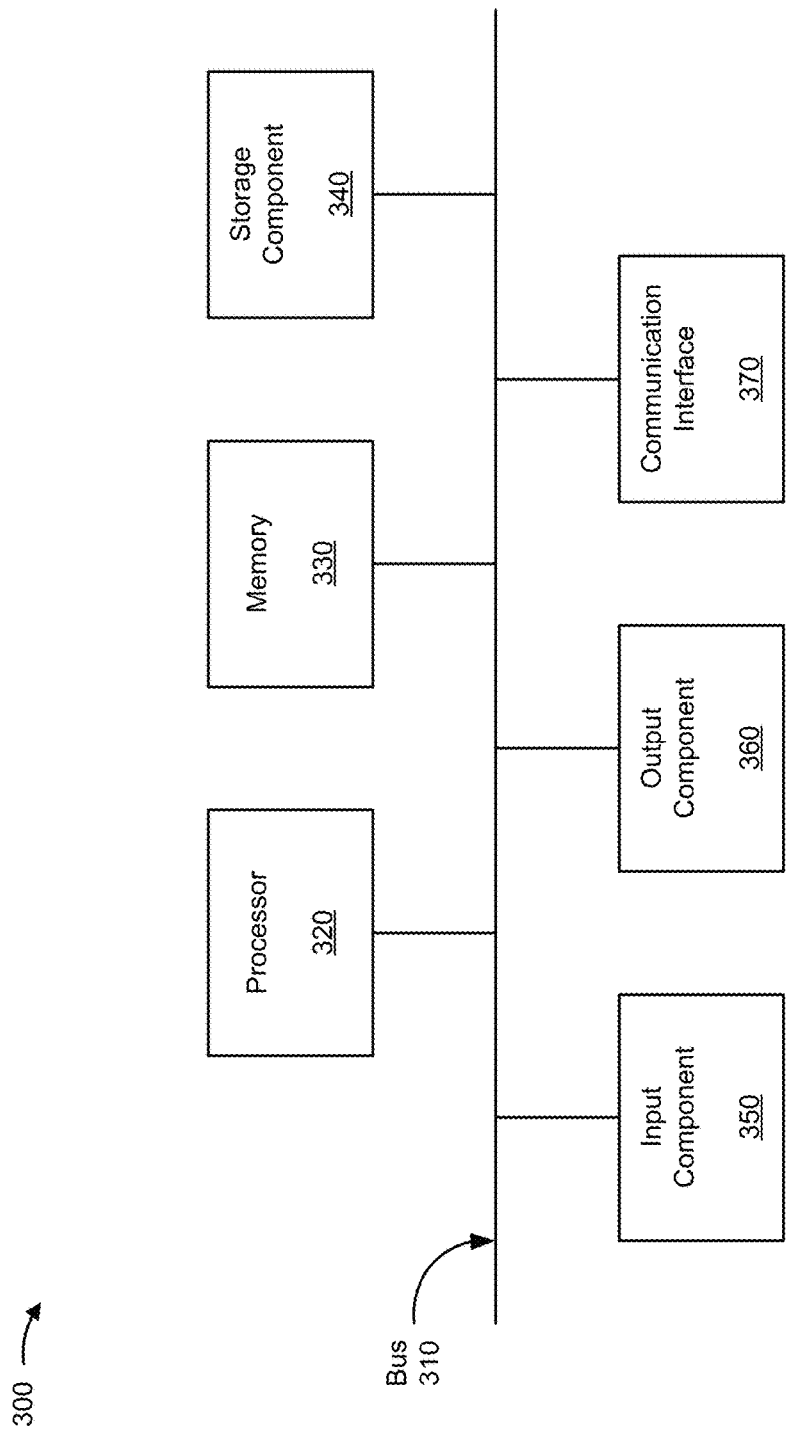
FIG. 3 is a diagram of example components of one or more devices of FIG. 2.

FIG. 3 is a diagram of example components of a device 300. Device 300 may correspond to UE 210, base station 220, MME 230, and provisioning device 240. In some implementations, UE 210, base station 220, MME 230, and provisioning device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
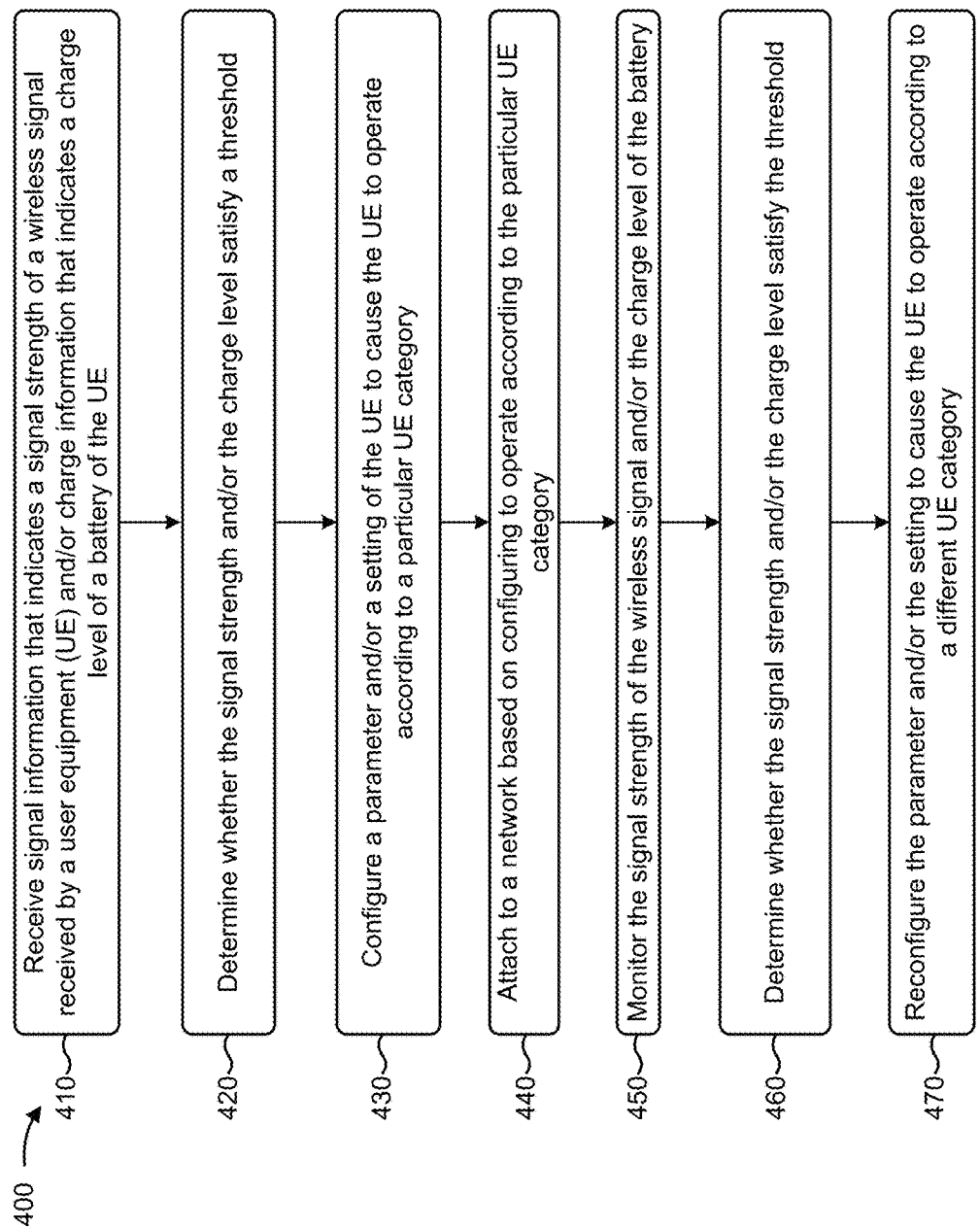
FIG. 4 is a flow chart of an example process for extending signal coverage and charge duration of a user equipment.

FIG. 4 is a flow chart of an example process 400 for extending signal coverage and charge duration of a UE. In some implementations, one or more process blocks of FIG. 4 may be performed by UE 210. In some implementations, one or more process blocks of FIG. 4 may be performed by another device or a group of devices separate from or including UE 210, such as base station 220, MME 230, and provisioning device 240.

As shown in FIG. 4, process 400 may include receiving signal information that indicates a signal strength of a wireless signal received by a UE and/or charge information that indicates a charge level of a battery of the UE (block 410). For example, UE 210 may determine a signal strength of a wireless signal received by UE 210 and/or a charge level of a battery of UE 210 (e.g., by measuring the signal strength or the charge level).

In some implementations, the signal strength of the wireless signal may relate to transmitter (e.g., base station 220) power output as received by UE 210 (e.g., expressed as decibels to milliwatts (dBm)). In some implementations, the wireless signal may include an electromagnetic signal, such as a radio frequency (RF) signal, a Wi-Fi signal, a Bluetooth signal, and/or the like. In some implementations, a charge level may relate to a capacity of a battery of UE 210 expressed as a percentage of maximum capacity. For example, the charge level may include an expression of the present capacity of a battery as a percentage of maxim capacity. As another example, the charge level may include an expression of a percentage of a maximum capacity of a battery that has been discharged. In some implementations, a battery may include an electrochemical cell with connections to provide power to electrical devices.

In some implementations, UE 210 may receive the signal information and/or the charge information based on monitoring the signal strength and/or monitoring the charge level. For example, UE 210 may monitor the signal strength and/or charge level of UE 210 continuously, periodically, according to a schedule, or the like, such as by measuring the dBms of the signal and/or measuring capacity of a battery of UE 210.

As further shown in FIG. 4, process 400 may include determining whether the signal strength and/or the charge level satisfy a threshold (block 420). For example, UE 210 may determine whether the dBms of a signal and/or the charge level of a battery satisfy a threshold. In some implementations, UE 210 may determine whether the signal strength and/or the charge level satisfy a threshold based on monitoring the signal strength and/or the charge level and comparing signal information to a threshold strength and/or charge information to threshold charge level.

In some implementations, a threshold may be configured by a user of UE 210 and/or a network operator. In some implementations, a threshold, such as a threshold signal strength, may be configured on a per-call basis, by type of call, or on per-contact basis. For example, a first threshold may be configured for calls to an emergency line or an emergency contact and a second threshold may be configured for calls to other parties. As another example, a first threshold signal strength, such as a signal strength associated with a particular quality of service, may be configured for calls to/from a first telephone number and a second threshold signal strength associated with a different quality of service may be configured for calls to/from a second telephone number. In some implementations, a threshold may include a default threshold, a user-defined threshold, and/or the like.

In some implementations, UE 210 may determine whether the signal strength and/or the charge level of UE 210 satisfy the threshold based on comparing the signal information and/or the charge information and a threshold. For example, UE 210 may compare the signal information to information identifying a threshold signal strength. In some implementations, the threshold signal strength may include a default threshold, a threshold configured by network operator, a threshold configured by a user of UE 210, or the like. Additionally, or alternatively, UE 210 may compare the charge information to information identifying a threshold charge level. In some implementations, the threshold charge level may include a default threshold, a threshold configured by network operator, a threshold configured by a user of UE 210, or the like.

In some implementations, UE 210 may determine whether a particular type of signal coverage is available. For example, UE 210 may determine whether LTE signal coverage or roaming signal coverage is available (e.g., when UE 210 is outside of the coverage of network 250). In some implementations, UE 210 may determine whether the particular type of signal coverage is available, rather than determining a signal strength of a wireless signal and/or a charge level of a battery.

In some implementations, UE 210 may provide a notification or message for display to a user of UE 210 based on determining whether the signal strength and/or charge level satisfy a threshold. For example, UE 210 may provide the notification or the message when UE 210 determines that the signal strength and/or the charge level do not satisfy the threshold. In some implementations, when providing the notification or message for display, UE 210 may permit the user to indicate whether the user wishes to configure a parameter or a setting of UE 210.

As further shown in FIG. 4, process 400 may include configuring a parameter and/or a setting of the UE to cause the UE to operate according to a particular UE category (block 430). For example, UE 210 may configure a parameter and/or a setting of UE 210 to cause UE 210 to operate according to a particular UE category based on determining whether the signal strength and/or the charge level satisfy a threshold.

In some implementations, a parameter may include one or more 3GPP RF parameters (e.g., maximum UE channel bandwidth, uplink/downlink shared channel (UL/DL-SCH) transport block bits transmitted within a transmission time interval (TTI), or the like). Additionally, or alternatively, a parameter may include filter parameters, power output parameters, or the like. In some implementations, a setting may include hardware settings of UE 210, such as a mode of a modem of UE 210, hardware settings related to communications and/or data transmissions of UE 210, and/or the like. Additionally, or alternatively, a setting may include a setting of an application installed on UE 210, executing on UE 210, or executing remotely from UE 210. For example, a setting may relate to delay sensitivity of a voice client of UE 210, transmission voice buffer of UE 210, jitter buffer of UE 210, error tolerance of UE 210, communications and/or data transmissions of UE 210, and/or the like.

In some implementations, a setting, or a parameter, may relate to data used by UE 210. For example, the setting or the parameter may relate to data used for a voice transmission, a short message service (SMS) transmission, a multimedia messaging service (MMS) transmission, a background data transmission, or the like. As another example, when configuring a setting or a parameter related to data used by UE 210, UE 210 may configure UE 210 to repeat transmissions, such as when a signal strength fails to satisfy a threshold. As another example, when configuring a setting or a parameter related to data used by UE 210, UE 210 may configure UE 210 to reduce transmissions, such as when a charge level of a battery of UE 210 does not satisfy a threshold.

In some implementations, a UE category may include an LTE category that defines a 3GPP combined uplink/downlink (UL/DL) capability specification (e.g., LTE category M1, LTE category 1, LTE category 2, etc.). For example, the 3GPP combined UL/DL capability specification may include a downlink shared channel (DL-SCH) specification, an uplink shared channel (UL-SCH) specification, and/or a transmission time interval (TTI) specification. In some cases, UE 210 may be described by a particular UE category according to which UE 210 may operate. For example, a particular type of UE 210 that can operate according to LTE category 4 may be described, or referred to, as an LTE category 4 device. In some implementations, a UE category may include a device category associated with a type of device different than a UE. For example, a UE category may include a device category associated with an Internet of things (IoT), or machine-to-machine (M2M), device, such as an LTE machine type communication (LTE-M) category (e.g., LTE category M1, LTE category M2, etc.).

In some implementations, UE 210 may configure the parameter and/or setting of UE 210 to cause UE 210 to operate according to a particular UE category. For example, UE 210 may configure the parameter and/or the setting of UE 210 to cause UE 210 to operate according to LTE category M1. Additionally, or alternatively, UE 210 may configure the parameter and/or setting of UE 210 to operate according to a lower UE category (e.g., relative to the current UE category according to which UE 210 is operating). For example, UE 210 may be configured to operate according to LTE category 4 (e.g. by default) and may configure the parameter and/or setting to operate according to LTE category 3, 2, M1, or the like.

In some implementations, UE 210 may disable or reduce one of more functionalities of UE 210, such as when configuring to operate according a particular UE category. For example, UE 210 may disable or reduce background data transmissions, streaming data, all data transmissions other than voice and SMS data transmission, and/or the like.

In some implementations, when configuring to operate according to a particular category, UE 210 may configure to operate according to a UE category associated with a different type of device. For example, a smart phone associated with LTE category 4 (e.g., an LTE UE-category) may configure to operate according to LTE category M1 (e.g., an LTE machine type communication (LTE-M) category), typically associated with an Internet of things (IoT), or machine-to-machine (M2M), device, such as a smart thermostat, a smart light switch, or a smart door lock. This enables UE 210 to benefit from configurations of settings and/or parameters associated with different types of devices.

As further shown in FIG. 4, process 400 may include attaching to a network based on configuring to operate according to the particular UE category (block 440). For example, UE 210 may find and select network 250 while operating according to the particular UE category, such as LTE category M1. In some implementations, UE 210 may send an attach request message to network 250 in association with attaching to network 250.

In some implementations, UE 210 may provide information to provisioning device 240 that identifies the particular UE category. For example, UE 210 may provide the information to provisioning device 240 to enable provisioning device 240 to validate whether UE 210 has permission to operate according to the particular UE category.

In some implementations, when attaching to network 250, UE 210 may negotiate settings with network 250 (e.g., by negotiating with a device connected to network 250). In some implementations, when negotiating settings with network 250, UE 210 may negotiate settings for a power saving mode (e.g., sleep time/duration settings). For example, UE 210 may negotiate LTE power saving mode settings, such as a time of day, a day of the week, and/or an amount of time that UE 210 will be dormant. Additionally, or alternatively, UE 210 may negotiate transmission and/or reception settings. For example, UE 210 may negotiate LTE extended discontinuous reception (eDRX) settings, such as idle time between paging cycles, duration of a paging cycle, and/or the like. In this way, UE 210 may negotiate a setting of UE 210 that enables UE 210 to improve communications and/or charge duration of UE 210.

As further shown in FIG. 4, process 400 may include monitoring the signal strength of the wireless signal and/or the charge level of the battery (block 450). For example, UE 210 may monitor the signal strength, or signal power, of the wireless signal received by UE 210 and/or the charge level of the battery of UE 210. In some implementations, when monitoring for signal strength, UE 210 may monitor for a particular type of coverage. For example, UE 210 may monitor for availability of roaming coverage.

In some implementations, UE 210 may prioritize switching to using a particular type of coverage (e.g., roaming coverage) when available (e.g., rather than continuing to operate according to the particular UE category). Conversely, when monitoring for signal strength, UE 210 may prioritize continuing to operate according to the particular UE category (e.g., rather than using a particular type of coverage when available). In some implementations, prioritization of using a particular type of coverage or operating according to a particular UE category may be based on default settings, user selected settings, and/or the like.

In some implementations, when monitoring for charge level, UE 210 may monitor for charging and/or connection to a power. For example, UE 210 may monitor for connection to a wall charger, receipt of electrical current from a power source other than the battery of UE 210, and/or the like. In some implementations, UE 210 may monitor for charging and/or connection to a power source to determine whether to continue to operate according to the particular UE category.

As further shown in FIG. 4, process 400 may include determining whether the signal strength and/or the charge level satisfy the threshold (block 460). For example, UE 210 may determine whether the signal strength satisfies a threshold signal strength and/or whether the charge level of a battery of UE 210 satisfies a threshold charge level. In some implementations, determining whether the signal strength and/or charge level satisfy a threshold may be performed as described with respect to block 420. For example, UE 210 may determine whether the signal strength and/or charge level for UE 210 satisfy the threshold based on comparing the signal strength information to a threshold signal strength and/or comparing the charge information to a threshold charge level.

In some implementations, UE 210 may determine whether a particular type of coverage (e.g., roaming coverage) is available. For example, UE 210 may determine whether a particular type of coverage is available when, or rather than, determining whether the signal strength satisfies a threshold signal strength. Additionally, or alternatively, UE 210 may determine whether UE 210 is connected to a charger or a power source other than the battery of UE 210. For example, UE 210 may determine whether UE 210 is connected to a charger or another power source when, or rather than, determining whether the charge level satisfies the threshold charge level.

As further shown in FIG. 4, process 400 may include reconfiguring the parameter and/or the setting to cause the UE to operate according to a different UE category (block 470). For example, UE 210 may reconfigure the parameter and/or setting to cause UE 210 to operate according to a different UE category, such as a lower UE category, or a higher UE category, than the UE category according to which UE 210 is currently operating.

In some implementations, UE 210 may reconfigure the parameter and/or the setting based on determining whether the signal strength and/or the charge level satisfy the threshold. For example, UE 210 may reconfigure the parameter and/or the setting based on the signal strength and/or the charge level satisfying the threshold. Conversely, and as another example, UE 210 may not reconfigure the parameter and/or the setting based on the signal strength and/or the charge level failing to satisfy the threshold.

In some implementations, reconfiguration of the parameter and/or setting may be performed as described with respect to block 420. For example, UE 210 may reconfigure a 3GPP RF parameter, an UL/DL parameter, a filter parameter, a power output parameter, a hardware setting of UE 210, and/or a setting of applications of UE 210.

In some implementations, UE 210 may reconfigure UE 210 to operate according to a particular UE category. For example, UE 210 may reconfigure UE 210 to operate according to a default UE category. As another example, UE 210 may reconfigure UE 210 to operate according to a higher UE category than the UE category at which UE 210 is currently operating, such by reconfiguring from operating according to LTE category M1 to operating according to LTE category 4.

In some implementations, UE 210 may detach from network 250 and reattach to network 250 based on reconfiguring. For example, UE 210 may detach and reattach to network 250 to enable provisioning device 240 to validate that UE 210 has permission to operate according to a different configuration, a different UE category, and/or the like.

In some implementations, process 400 may include returning to block 450 after block 470. For example, UE 210 may return to monitoring the signal strength and/or the charge level, determining whether the signal strength and/or the charge level satisfy a threshold, and reconfiguring the parameter and/or the setting. In some implementations, process 400 may include repeatedly performing blocks 450 through 470.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
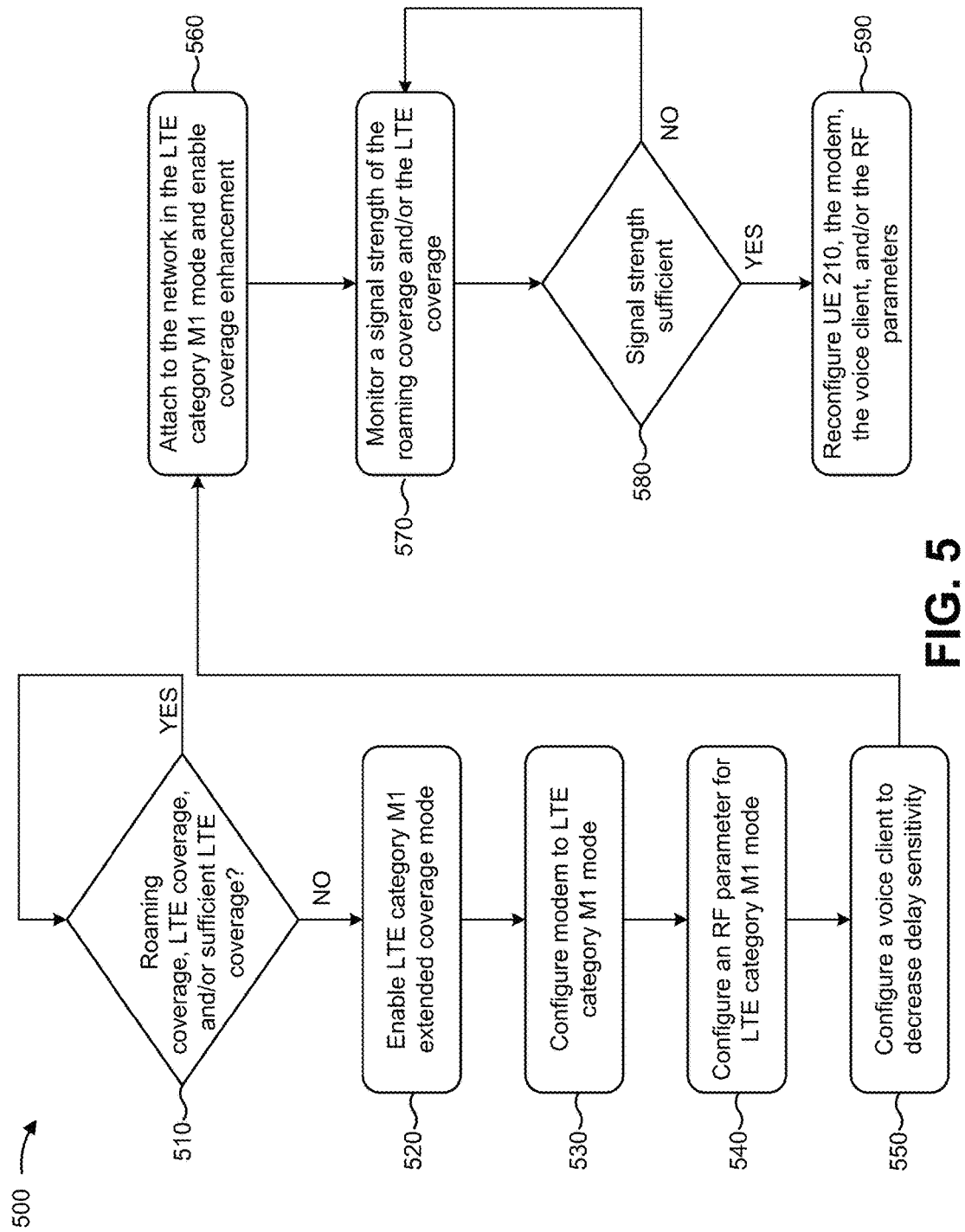
FIG. 5 is a flow chart of an example process relating to the example process shown in FIG. 4.

FIG. 5 is a flow chart of an example process 500 relating to the example process shown in FIG. 4. Specifically, FIG. 5 shows an example process for extending signal coverage of UE 210. In some implementations, one or more process blocks of FIG. 5 may be performed by UE 210. In some implementations, one or more process blocks of FIG. 5 may be performed by another device or a group of devices separate from or including UE 210, such as base station 220, MME 230, and provisioning device 240.

As shown in FIG. 5, process 500 may include determining whether roaming coverage, LTE coverage, and/or sufficient LTE coverage is present (block 510). For example, UE 210 may determine whether roaming coverage, LTE coverage, and/or sufficient LTE coverage is available (e.g., by monitoring a strength of a wireless signal received by UE 210 and/or a type of coverage available). In some implementations, when determining whether sufficient LTE coverage is available, UE 210 may determine whether a signal strength associated with the LTE coverage satisfies a threshold signal strength. If UE 210 determines that roaming coverage, LTE coverage, and/or sufficient LTE coverage is present, then process 500 may include returning back to block 510 (block 510—YES).

As further shown in FIG. 5, if UE 210 determines that roaming coverage, LTE coverage, and/or sufficient LTE coverage is not present, then process 500 may include enabling LTE category M1 extended coverage mode (block 520). For example, UE 210 may enable LTE category M1 extended coverage mode. In some implementations, when enabling LTE category M1 extended coverage mode, UE 210 may configure a setting and/or a parameter of UE 210 to enable UE 210 to operate according to LTE category M1 extended coverage mode. In some implementations, when enabling LTE category M1 extended coverage mode, UE 210 may enable UE 210 to operate according to a lower LTE category than the LTE category at which UE 210 is currently operating, at which UE 210 operates by default, or the like.

As further shown in FIG. 5, process 500 may include configuring a modem to LTE category M1 mode (block 530). For example, UE 210 may configure a modem of UE 210 to LTE category M1 mode to cause, or enable, the modem to operate according to LTE category M1. In some implementations, when configuring a modem to LTE category M1, UE 210 may configure a setting and/or a parameter of the modem to enable the modem to operate according to LTE category M1. Additionally, or alternatively, configuring the modem may cause, or enable, UE 210 to operate according to LTE category M1.

As further shown in FIG. 5, process 500 may include configuring an RF parameter for LTE category M1 mode (block 540). For example, UE 210 may configure an RF parameter for LTE category M1 mode to enable UE 210 to operate according to LTE category M1. In some implementations, configuring the RF parameter may enable UE 210 to communicate when signal strength of a wireless signal does not satisfy a threshold or when a particular type of coverage is not available (e.g., roaming coverage or LTE coverage), thereby improving communications of UE 210.

As shown in FIG. 5, process 500 may include configuring a voice client to decrease delay sensitivity (block 550). For example, UE 210 may configure a voice client of UE 210 to decrease delay sensitivity of the voice client, while maintaining a particular quality of service that allows for intelligible calls. In some implementations, when configuring a voice client, UE 210 may configure a setting and/or a parameter of the voice client. In some implementations, configuring the voice client may enable UE 210 to communicate when signal strength of a wireless signal does not satisfy a threshold or when a particular type of coverage is not available, thereby improving communications of UE 210.

As further shown in FIG. 5, process 500 may include attaching to the network in LTE category M1 mode and enabling coverage enhancement (block 560). For example, UE 210 may attach to network 250 in LTE category M1 mode and enable coverage enhancement. In some implementations, when attaching to network 250, UE 210 may send an attach request to MME 230. Additionally, or alternatively, UE 210 may send a request to provisioning device 240, such as to cause provisioning device 240 to determine whether UE 210 is permitted to operate according to LTE category M1 (e.g., to determine whether a user account associated with UE 210 has a subscription for LTE category M1 services). In some implementations, when enabling coverage enhancement, UE 210 may configure a setting or a parameter of UE 210, such as to cause UE 210 to repeat transmissions of communications and/or to frequency hop. This enables UE 210 to communicate when signal strength of a wireless signal does not satisfy a threshold, thereby improving communications of UE 210.

As further shown in FIG. 5, process 500 may include monitoring a signal strength of the roaming coverage and/or the LTE coverage (block 570). For example, UE 210 may monitor the signal strength of a wireless signal associated with the roaming coverage and/or the LTE coverage. In some implementations, UE 210 may monitor the signal strength by measuring the signal strength (e.g., dBms) periodically, according to a schedule, based on input of a user of UE 210, or the like.

As further shown in FIG. 5, process 500 may include determining whether the signal strength is sufficient (block 580). For example, UE 210 may determine whether the signal strength is sufficient for normal operation of UE 210. In some implementations, UE 210 may determine whether the signal strength is sufficient by comparing the signal strength to a threshold signal strength, a default signal strength, or the like. If the signal strength is not sufficient for normal operation, then process 500 may include returning to block 570. For example, UE 210 may continue to monitor the signal strength of a wireless signal associated with the roaming coverage and/or the LTE coverage.

As further shown in FIG. 5, if the signal strength is sufficient for normal operation, then process 500 may include reconfiguring UE 210, the modem, the voice client, and/or the RF parameters (block 590). For example, if the signal strength satisfies a threshold signal strength, then UE 210 may reconfigure UE 210, the modem, the voice client, and/or the RF parameters to operate according to a default LTE category, a user specified LTE category, an LTE category higher than LTE category M1 (e.g., LTE category 2 or LTE category 4), or the like. In some implementations, when LTE 210 reconfigures, UE 210 may monitor a signal strength of a wireless signal, determine whether a particular type of coverage is available, and/or determine whether the coverage is sufficient. In other words, process 500 may include returning to block 510 and/or block 580.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
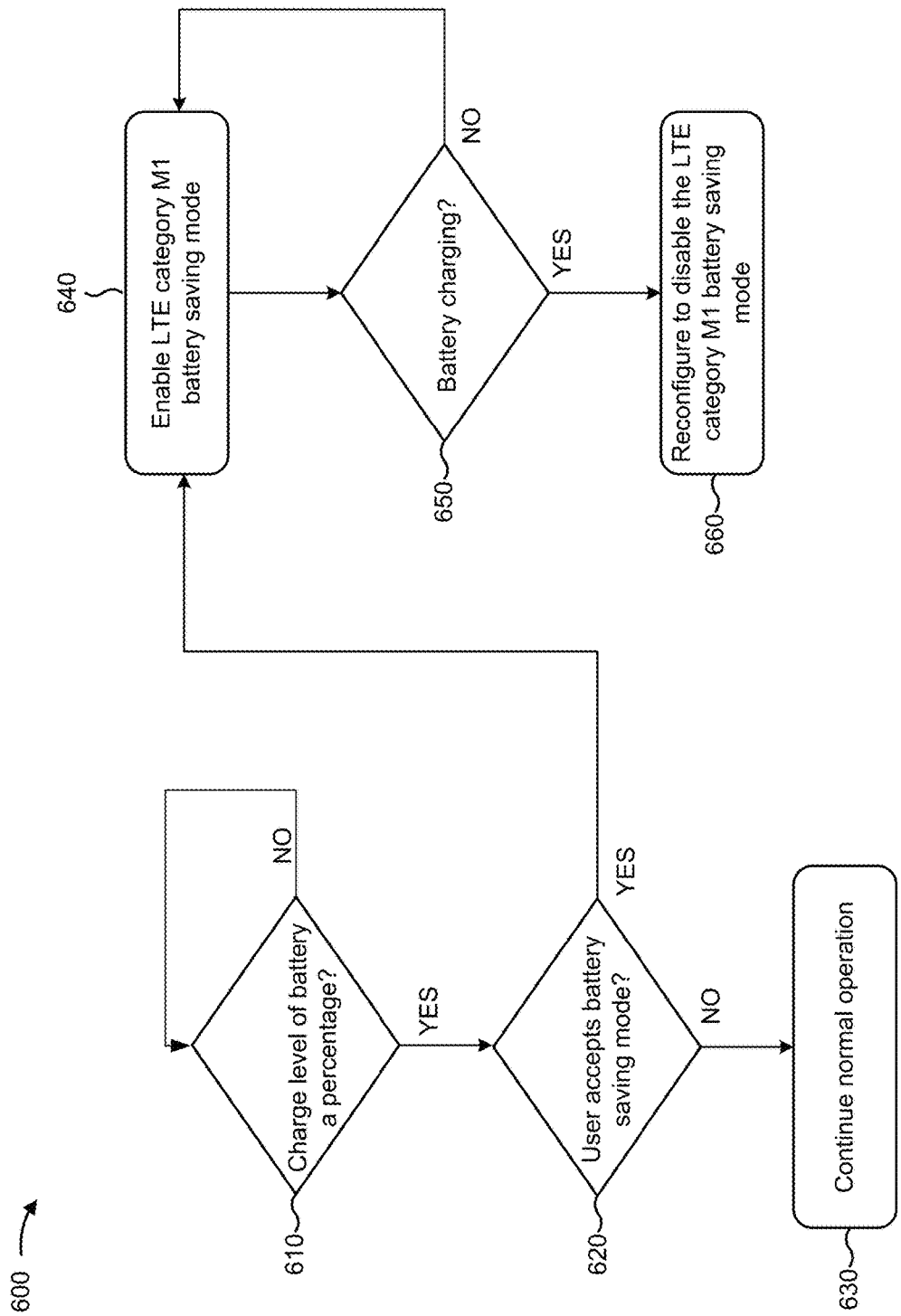
FIG. 6 is a flow chart of an example process relating to the example process shown in FIG. 4.

FIG. 6 is an example process 600 relating to the example process shown in FIG. 4. Specifically, FIG. 6 shows an example process for extending charge duration of UE 210. In some implementations, one or more process blocks of FIG. 6 may be performed by UE 210. In some implementations, one or more process blocks of FIG. 6 may be performed by another device or a group of devices separate from or including UE 210, such as base station 220, MME 230, and provisioning device 240.

As shown in FIG. 6, process 600 may include determining whether a charge level of a battery is below a percentage (block 610). For example, UE 210 may determine whether a charge level of a battery of UE 210 is below three percent (3%), 60 percent (60%), or some other percentage of the battery's total charge capacity. In some implementations, the percentage may include a default percentage, a percentage configured by a user of UE 210, or the like.

As further shown in FIG. 6, if UE 210 determines that the charge level of the battery is not below the percentage, then process 600 may include returning to block 610 (block 610-NO). For example, if the charge level of the battery is greater than 3%, then process 600 may include continuing to determine whether the charge level is below the percentage.

As further shown in FIG. 6, if the charge level of the battery is below the percentage (block 610—YES), then process 600 may include determining whether a user of the UE accepts a battery saving mode (block 620). For example, if the charge level of the battery is below 3%, then UE 210 may provide, for display, a notification indicating the charge level and determining whether a user of UE 210 wants UE 210 to operate according to LTE category M1 battery saving mode (e.g., based on input of the user).

As further shown in FIG. 6, if the user does not accept the battery saving mode (block 620-NO), then process 600 may include continuing normal operation (block 630). For example, if the user does not accept the battery saving mode, then UE 210 may operate without configuring a setting or a parameter of UE 210. As another example, UE 210 may continue to operate in LTE power saving mode, different from a battery saving mode, until the battery of UE 210 is depleted of a charge.

As further shown in FIG. 6, if the user accepts the battery saving mode (block 620—YES), then process 600 may include enabling an LTE category M1 battery saving mode (block 640). For example, if the user accepts the battery saving mode, then UE 210 may enable the LTE category M1 battery saving mode. In some implementations, UE 210 may configure a setting and/or a parameter of UE 210 when enabling the LTE category M1 battery saving mode, such as by limiting voice data or SMS data to optimize duration of the charge of the battery.

As further shown in FIG. 6, process 600 may include determining whether the battery is charging (block 650). For example, UE 210 may determine whether the battery is charging while in LTE category M1 battery saving mode. In some implementations, UE 210 may determine whether UE 210 is receiving a charge or is connected to a power source other than the battery of UE 210 when determining whether the battery is charging.

As further shown in FIG. 6, if the battery is not charging (block 650—NO), then process 600 may include returning to block 640. For example, if the battery is not charging, then UE 210 may continue to operate in LTE category M1 battery saving mode.

As further shown in FIG. 6, if the battery is charging (block 650—YES), then process 600 may include reconfiguring to disable the LTE category M1 battery saving mode (block 660). For example, if the battery is charging, then UE 210 may reconfigure UE 210 to disable the LTE category M1 battery saving mode. For example, UE 210 may reconfigure a setting and/or a parameter of UE 210 to a default configuration and/or a user-defined configuration to disable the LTE category M1 battery saving mode.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
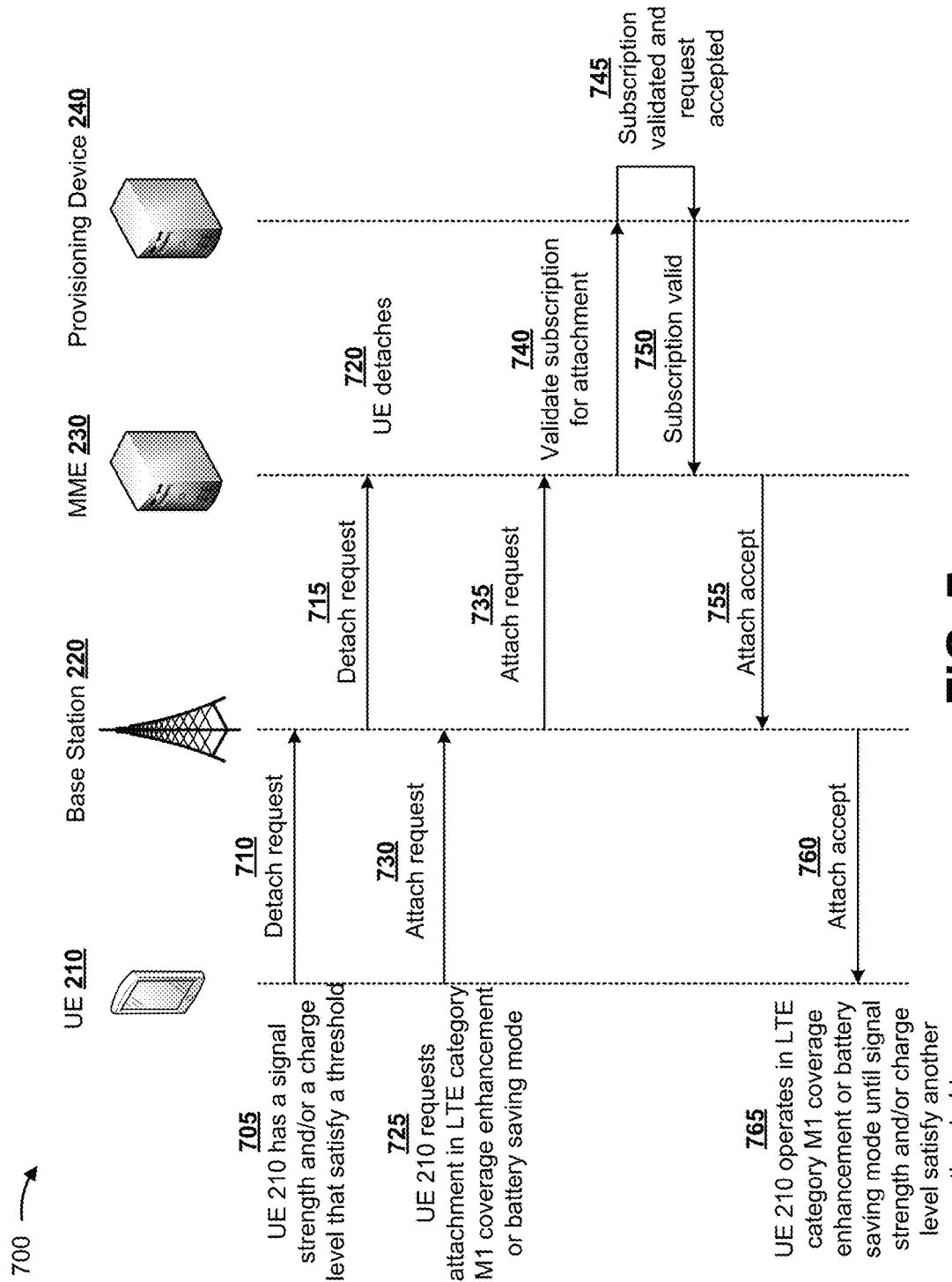
FIG. 7 is a call flow diagram of an example implementation relating to the example process shown in FIG. 4.

FIG. 7 is a call flow diagram of an example implementation 700 relating to the example process shown in FIG. 4. Specifically, FIG. 7 shows an example implementation of a successful validation of UE 210. Example implementation 700 includes UE 210, base station 220, MME 230, and provisioning device 240.

As shown in FIG. 7, and by reference number 705, UE 210 may have a signal strength and/or a charge level that satisfy a threshold. In some implementations, UE 210 may determine that UE 210 has a signal strength and/or a charge level that satisfy a threshold by detecting, and comparing to a threshold, the signal strength and/or the charge level. As shown by reference number 710, UE 210 may transmit a detach request message to base station 220. For example, UE 210 may transmit the detach request based on determining that UE 210 has a signal strength and/or a charge level that satisfy a threshold. As shown by reference number 715, base station 220 may transmit the detach request message, from UE 210, to MME 230. As shown by reference number 720, MME 230 may process the detach request and cause UE 210 to detach (e.g., from network 250).

As shown by reference number 725, UE 210 may request attachment (e.g., to network 250) in LTE category M1 coverage enhancement mode or battery saving mode, such as by sending an attach request message. As shown by reference number 730, UE 210 may transmit an attach request message to base station 220. In some implementations, the attach request message may include a request to attach to network 250 in LTE category M1 coverage enhancement mode or battery saving mode.

As shown by reference number 735, base station 220 may transmit the attach request message to MME 230. As shown by reference number 740, MME 230 may send a request to validate a subscription associated with UE 210 to determine whether to permit UE 210 to attach in LTE category M1 coverage extension mode or battery saving mode. As shown by reference number 745, provisioning device 240 may validate the subscription associated with UE 210 and accept the request for UE 210 to attach in LTE category M1 coverage extension mode or battery saving mode.

As shown by reference number 750, provisioning device 240 may transmit a subscription valid message to MME 230 to indicate that the subscription associated with UE 210 has been validated. As shown by reference number 755, MME 230 may transmit an attach accept message to base station 220 (e.g., based on provisioning device 240 validating the subscription associated with UE 210). As shown by reference number 760, base station 220 may transmit the attach accept message to UE 210. As shown by reference number 765, UE 210 may operate in LTE category M1 coverage extension mode or battery saving mode until a signal strength and/or a charge level satisfy another threshold.

As indicated above, FIG. 7 is provided merely as an example. Other examples are possible and may differ from what was described with regard to FIG. 7.

Figure 8:
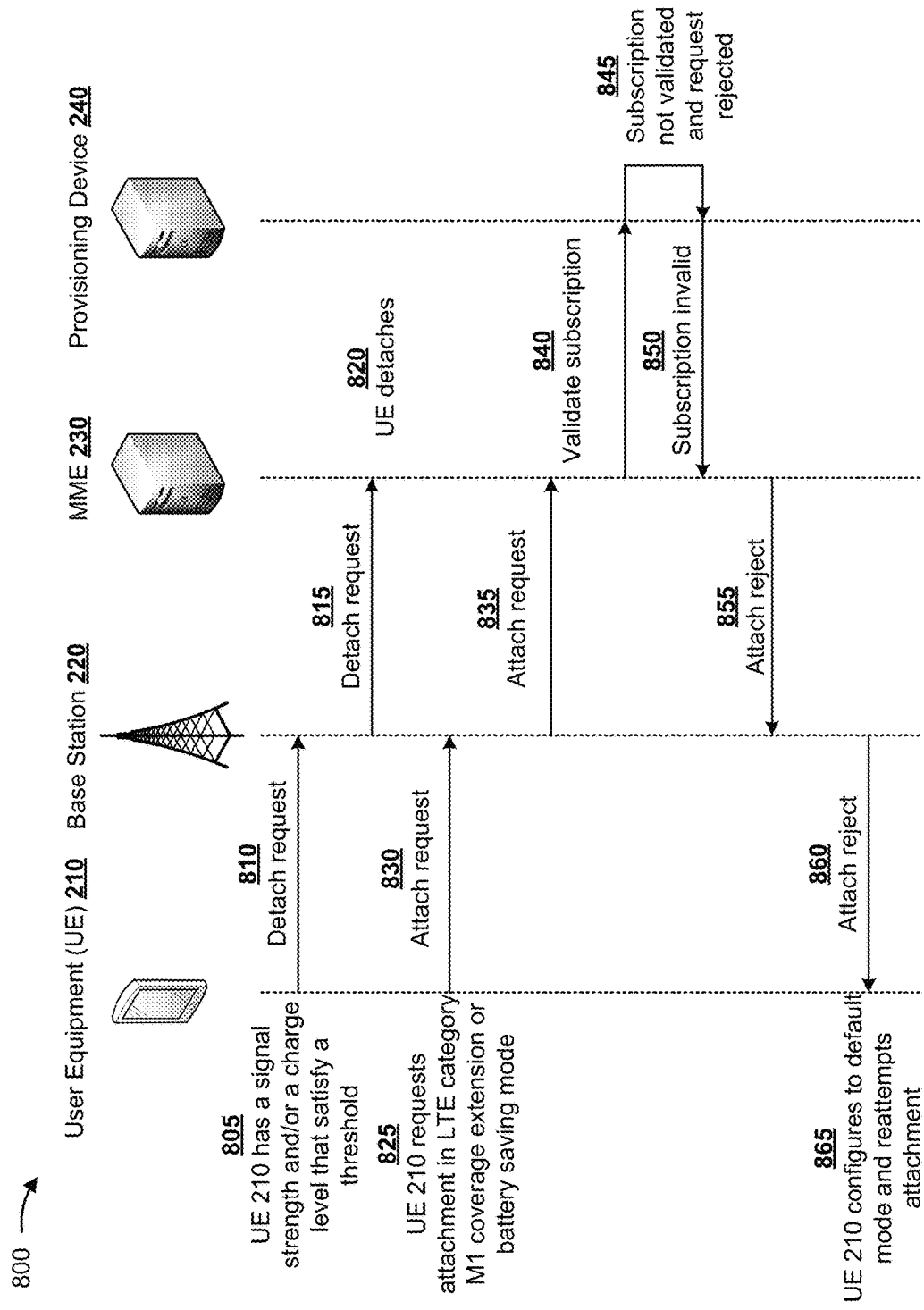
FIG. 8 is a call flow diagram of an example implementation relating to the example process shown in FIG. 4.

FIG. 8 is a call flow diagram of an example implementation 800 relating to the example process shown in FIG. 4. Specifically, FIG. 8 shows an example implementation of an unsuccessful validation of UE 210. Example implementation 800 includes UE 210, base station 220, MME 230, and provisioning device 240.

As shown in FIG. 8, and by reference number 805, UE 210 may have a signal strength and/or a charge level that satisfy a threshold. As shown by reference number 810, UE 210 may transmit a detach request message to base station 220. For example, UE 210 may send the detach request based on determining that UE 210 has a signal strength and/or a charge level that satisfy a threshold. As shown by reference number 815, base station 220 may transmit the detach request message to MME 230. As shown by reference number 820, MME 230 may process the detach request and cause UE 210 to detach (e.g., from network 250).

As shown by reference number 825, LTE 210 may request attachment in LTE category M1 coverage extension mode or battery saving mode, such as by sending an attach request message. As shown by reference number 830, UE 210 may transmit the attach request message to base station 220. In some implementations, the attach request message may include a request to attach to network 250 in LTE category M1 coverage extension mode or battery saving mode.

As shown by reference number 835, base station 220 may transmit the attach request message to MME 230. As shown by reference number 840, MME 230 may request provisioning device 240 to validate a subscription of UE 210 to determine whether to permit UE 210 to attach in LTE category M1 coverage extension mode or battery saving mode (e.g., based on processing the attach request message from UE 210). As shown by reference number 845, provisioning device 240 may fail to validate the subscription associated with UE 210 and may reject the request for UE 210 to attach in LTE category M1 coverage extension mode or battery saving mode.

As shown by reference number 850, provisioning device 240 may transmit a subscription invalid message to MME 230 to indicate that provisioning device 240 did not validate the subscription associated with UE 210. For example, MME 230 may transmit a message that includes an identifier indicating that the request was rejected due to an invalid subscription. As shown by reference number 855, MME 230 may transmit an attach reject message to base station 220 (e.g., based on provisioning device 240 failing to validate the subscription). As shown by reference number 860, base station 220 may transmit the attach reject message from MME 230 to UE 210. As shown by reference number 865, UE 210 may configure to a default configuration (e.g., a default or user-defined set of settings and/or parameters of UE 210) and may reattempt to attach to network 250.

As indicated above, FIG. 8 is provided merely as an example. Other examples are possible and may differ from what was described with regard to FIG. 8.

Implementations described herein enable a UE to configure a setting or a parameter of the UE to operate according to a particular UE category, such as a lower UE category than the UE category at which the UE is currently operating or a UE category associated with a different type of device than the UE. In this way, communications of a UE may be improved by permitting the UE to communicate when a signal strength of a wireless signal would otherwise prevent, or disrupt, the UE from communicating. Additionally, or alternatively, battery and/or power resources of the UE may be conserved by modifying one or more particular functionalities of the UE that consume significant battery and/or power resources. This enables extension of duration of a battery of the UE, thereby improving performance of the UE.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive signal information associated with a wireless signal or charge information associated with a charge level,
the signal information indicating a signal strength of the wireless signal,
the charge information indicating the charge level of a battery of the device;
identify a threshold based on call information regarding a call associated with the signal information;
determine, at a first time, whether the signal strength or the charge level satisfies the threshold;
configure a parameter or a setting of the device to cause the device to operate according to a long term evolution (LTE) category based on determining, at the first time, whether the signal strength or the charge level satisfies the threshold,
the LTE category being different from a default LTE category of the device,
the LTE category defining a third generation partnership project (3GPP) combined uplink and downlink capability specification;
attach to a network in association with configuring the parameter or the setting to cause the device to operate according to the LTE category;
monitor the signal strength of the wireless signal and for availability of roaming coverage;
determine, at a second time,
whether the signal strength satisfies the threshold, and
whether the roaming coverage is available; and
reconfigure the parameter or the setting to cause the device to operate according to a different category based on determining, at the second time, that the signal strength does not satisfy the threshold and that the roaming coverage is not available,
the different category including a category associated with an Internet of things device.

2. The device of claim 1, where the one or more processors, when configuring the parameter or the setting, are to:
configure the device to operate according to a lower LTE category than the default LTE category of the device.

3. The device of claim 1, where the one or more processors are further to:
request attachment to the network based on configuring the parameter or the setting of the device to cause the device to operate according to the LTE category,
the LTE category being LTE category M1;
receive information indicating whether the device is associated with a subscription that permits the device to operate according to the LTE category; and
where the one or more processors, when attaching to the network, are to:
attach to the network in LTE category M1 coverage enhancement mode based on the information indicating that the device is associated with the subscription that permits the device to operate according to the LTE category.

4. The device of claim 1, where the one or more processors, when configuring the parameter or the setting, are to:
configure the parameter or the setting to cause the device to operate according to a first LTE category based on the signal strength or the charge level satisfying the threshold, or
configure the parameter or the setting to cause the device to operate according to a second LTE category based on the signal strength or the charge level satisfying another threshold.

5. The device of claim 1, where the one or more processors are further to:
negotiate one or more transmission or reception settings related to coverage enhancement; and
where the one or more processors, when attaching to the network, are to:
attach to the network in association with negotiating the one or more transmission or reception settings related to coverage enhancement.

6. The device of claim 1, where the one or more processors are further to:
configure the 3GPP combined uplink and downlink capability specification,
the 3GPP combined uplink and downlink capability including at least one of:
an uplink shared channel (UL-SCH) specification associated with the LTE category,
a downlink shared channel (DL-SCH) specification associated with the LTE category, or
a transmission time interval (TTI) specification associated with the LTE category; and
where the one or more processors, when attaching to the network, are to:
attach to the network based on configuring the 3GPP combined uplink and downlink capability specification.

7. The device of claim 1,
where the one or more processors, when configuring the parameter or the setting of the device to cause the device to operate according to the LTE category, are to:
configure the parameter or the setting of the device to cause the device to operate according to the LTE category based on determining that the roaming coverage is not available.

8. A non-transitory computer-readable medium storing instructions, the instructions comprising:
one or more instructions that, when executed by one or more processors, cause the one or more processors to:
receive signal information that indicates a signal strength of a wireless signal received by a user equipment;
identify a threshold signal strength based on call information regarding a call associated with the signal information;
compare the signal information to information indicating the threshold signal strength;
determine, at a first time, whether the signal strength satisfies the threshold signal strength based on comparing the signal information and the information indicating the threshold signal strength;
configure the user equipment to operate according to a device category based on determining whether the signal strength satisfies the threshold signal strength,
the device category being associated with a setting or a parameter related to communications of the user equipment,
the device category being associated with an uplink and downlink capability specification;
request to attach to a network based on configuring the user equipment to operate according to the device category;

monitor an amount of signal power being received by the user equipment and for availability of roaming coverage;
determine, at a second time,
whether the amount of signal power being received by the user equipment satisfies the threshold signal strength, and
whether the roaming coverage is available; and
reconfigure the user equipment to operate according to a different device category based on determining that the amount of signal power being received by the user equipment does not satisfy the threshold signal strength and that the roaming coverage is not available,
the different device category including a device category associated with an Internet of things device.

9. The non-transitory computer-readable medium of claim 8, where the one or more instructions, when executed by the one or more processors, further cause the one or more processors to:
receive an indication that a request to attach to the network is denied;
reconfigure the user equipment to operate according to another different device category,
the other different device category being a higher device category than the device category; and
re-request to attach to the network based on reconfiguring the user equipment.

10. The non-transitory computer-readable medium of claim 8, where the one or more instructions, that cause the one or more processors to configure the user equipment, cause the one or more processors to:
configure a modem of the user equipment to operate according to the device category.

11. The non-transitory computer-readable medium of claim 8, where the one or more instructions, that cause the one or more processors to configure the user equipment, cause the one or more processors to:
configure a radio frequency (RF) parameter of the user equipment to cause the user equipment to operate according to the device category.

12. The non-transitory computer-readable medium of claim 8, where the one or more instructions, that cause the one or more processors to configure the user equipment, cause the one or more processors to:
configure a voice client of the user equipment to cause the user equipment to operate according to the device category.

13. The non-transitory computer-readable medium of claim 8,
where the one or more instructions, that cause the one or more processors to configure the user equipment to operate according to the device category, cause the one or more processors to:
configure the user equipment to operate according to the device category based on determining that the roaming coverage is available.

14. The non-transitory computer-readable medium of claim 8, where the one or more instructions, that cause the one or more processors to configure the user equipment, cause the one or more processors to:
configure a modem of the user equipment to repeat transmissions or frequency hop.

15. A method, comprising:
receiving, by a device, signal information associated with a wireless signal,
the signal information indicating a signal strength of the wireless signal;
identifying, by the device, a threshold based on call information regarding a call associated with the signal information;
determining, by the device and at a first time, whether the signal strength satisfies the threshold;
configuring, by the device, a parameter or a setting of the device to cause the device to operate according to a long term evolution (LTE) category based on determining, at the first time, whether the signal strength satisfies the threshold,
the LTE category being different from a default LTE category of the device;
attaching, by the device, to a network in association with configuring the parameter or the setting to cause the device to operate according to the LTE category;
monitoring, by the device, the signal strength of the wireless signal and for availability of roaming coverage;
determining, by the device and at a second time,
whether the signal strength satisfies the threshold, and
whether the roaming coverage is available; and
reconfiguring, by the device, the parameter or the setting to cause the device to operate according to a different category based on determining, at the second time, that the signal strength does not satisfy the threshold and that the roaming coverage is not available,
the different category including a category associated with an Internet of things device.

16. The method of claim 15, further comprising:
requesting attachment to the network based on configuring to operate according to the LTE category,
the LTE category being LTE category M1;
receiving information indicating whether the device is associated with a subscription that permits the device to operate according to the LTE category; and
where attaching to the network comprises:
attaching to the network in LTE category M1 coverage enhancement mode based on the information indicating that the device is associated with the subscription that permits the device to operate according to the LTE category.

17. The method of claim 15, where identifying the threshold based on call information regarding the call associated with the signal information comprises:
determining whether the threshold is a first threshold or second threshold,
the first threshold being associated with a first quality of service and the second threshold being associated with a second quality of service.

18. The method of claim 15, further comprising:
negotiating one or more transmission or reception settings related to coverage enhancement; and
where attaching to the network comprises:
attaching to the network in association with negotiating the one or more transmission or reception settings related to coverage enhancement.

19. The method of claim 15, where the LTE category defines a third generation partnership project (3GPP) combined uplink and downlink capability specification; and further comprising:
configuring the 3GPP combined uplink and downlink capability specification, the 3GPP combined uplink and downlink capability including at least one of:
   an uplink shared channel (UL-SCH) specification associated with the LTE category,
   a downlink shared channel (DL-SCH) specification associated with the LTE category, or
   a transmission time interval (TTI) specification associated with the LTE category; and
where attaching to the network comprises:
   attaching to the network based on configuring the 3GPP combined uplink and downlink capability specification.

20. The method of claim 15,
where configuring the parameter or the setting of the device to cause the device to operate according to the LTE category comprises:
   configuring, by the device, the parameter or the setting to cause the device to operate according to the LTE category based on determining that the roaming coverage is not available.

* * * * *